United States Patent
Lee et al.

(10) Patent No.: US 12,288,073 B2
(45) Date of Patent: Apr. 29, 2025

(54) INSTRUCTION PREFETCH THROTTLING

(71) Applicant: Arm Limited, Cambridge (GB)

(72) Inventors: Chang Joo Lee, Austin, TX (US);
Jason Lee Setter, Austin, TX (US);
Julia Kay Lanier, Austin, TX (US);
Michael Brian Schinzler, Round Rock, TX (US); Yasuo Ishii, Austin, TX (US)

(73) Assignee: Arm Limited, Cambridge (GB)

( * ) Notice: Subject to any disclaimer, the term of this patent is extended or adjusted under 35 U.S.C. 154(b) by 36 days.

(21) Appl. No.: 18/129,979

(22) Filed: Apr. 3, 2023

(65) Prior Publication Data
US 2024/0329999 A1    Oct. 3, 2024

(51) Int. Cl.
*G06F 9/30*    (2018.01)
*G06F 9/38*    (2018.01)

(52) U.S. Cl.
CPC .......... *G06F 9/3806* (2013.01); *G06F 9/3861* (2013.01); *G06F 9/3802* (2013.01)

(58) Field of Classification Search
CPC ..... G06F 9/3806; G06F 9/3861; G06F 9/3802
See application file for complete search history.

(56) References Cited

U.S. PATENT DOCUMENTS

| | | | | |
|---|---|---|---|---|
| 7,359,890 B1* | 4/2008 | Ku | ................... | G06F 16/24552 |
| 10,296,460 B2* | 5/2019 | Sudhir | ................ | G06F 12/0897 |
| 10,474,578 B2* | 11/2019 | Lee | ..................... | G06F 12/0855 |
| 2005/0076181 A1* | 4/2005 | Hsu | ..................... | G06F 12/0862 |
| | | | | 711/137 |
| 2006/0179238 A1* | 8/2006 | Griswell, Jr. | ........ | G06F 9/30043 |
| | | | | 712/E9.047 |
| 2013/0013867 A1* | 1/2013 | Manne | ................ | G06F 12/0862 |
| | | | | 711/137 |
| 2014/0108740 A1* | 4/2014 | Rafacz | ................ | G06F 12/0862 |
| | | | | 711/137 |
| 2019/0065376 A1 | 2/2019 | Lee et al. | | |
| 2021/0173783 A1 | 6/2021 | Thyagarajan et al. | | |

OTHER PUBLICATIONS

U.S. Appl. No. 18/754,594, filed Jun. 26, 2024, Ecco et al.
PCT International Search Report and Written Opinion of the International Searching Authority for PCT/GB2024/050363 mailed May 16, 2024, 14 pages.

* cited by examiner

*Primary Examiner* — Corey S Faherty
(74) *Attorney, Agent, or Firm* — NIXON & VANDERHYE P.C.

(57) ABSTRACT

An apparatus is provided for limiting the effective utilisation of an instruction fetch queue. The instruction fetch entries are used to control the prefetching of instructions from memory, such that those instructions are stored in an instruction cache prior to being required by execution circuitry while executing a program. By limiting the effective utilisation of the instruction fetch queue, fewer instructions will be prefetched and fewer instructions will be allocated to the instruction cache, thus causing fewer evictions from the instruction cache. In the event that the instruction fetch entries are for instructions that are unnecessary to the program, the pollution of the instruction cache with these unnecessary instructions can be mitigated.

18 Claims, 10 Drawing Sheets

INSTRUCTION PREFETCH THROTTLING

TECHNICAL FIELD

The present disclosure relates to data processing, and in particular to controlling how instructions are fetched from memory.

DESCRIPTION

When executing a program, data processing apparatus can make predictions regarding the instructions that will be required in the future. A data processing apparatus that is provided with an instruction cache can use these predictions to pre-populate the instruction cache with predicted instructions to decrease the latency of accessing those instructions if they are required in the future.

SUMMARY

Viewed from a first example configuration, there is provided an apparatus comprising: an instruction fetch queue for storage of up to a maximum number of instruction fetch entries; prefetching circuitry configured, for each of the instruction fetch entries, to fetch an instruction indicated by that instruction fetch entry and to cause the instruction to be allocated to an instruction cache; and control circuitry configured to suppress allocation of a given instruction fetch entry to the instruction fetch queue in response to a number of the instruction fetch entries meeting or exceeding a limit value, wherein the limit value is less than the maximum number of entries.

Viewed from a second example configuration, there is provided a method comprising: storing up to a maximum number of instruction fetch entries; for each of the instruction fetch entries, fetching an instruction indicated by that instruction fetch entry and causing the instruction to be allocated to an instruction cache; and suppressing allocation of a given instruction fetch entry in response to a number of instruction fetch entries meeting or exceeding a limit value, wherein the limit value is less than the maximum number of entries.

Viewed from a third example configuration, there is provided a non-transitory computer-readable medium to store computer-readable code for fabrication of an apparatus comprising: an instruction fetch queue for storage of up to a maximum number of instruction fetch entries; prefetching circuitry configured, for each of the instruction fetch entries, to fetch an instruction indicated by that instruction fetch entry and to cause the instruction to be allocated to an instruction cache; and control circuitry configured to suppress allocation of a given instruction fetch entry to the instruction fetch queue in response to a number of the instruction fetch entries meeting or exceeding a limit value, wherein the limit value is less than the maximum number of entries.

Viewed from another example configuration, there is provided a system comprising: the apparatus described above implemented in at least one packaged chip; at least one system component; and a board, wherein the at least one packaged chip and the at least one system component are assembled on the board.

Viewed from another example configuration, there is provided a chip-containing product comprising the system described above assembled on a further board with at least one other product component.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
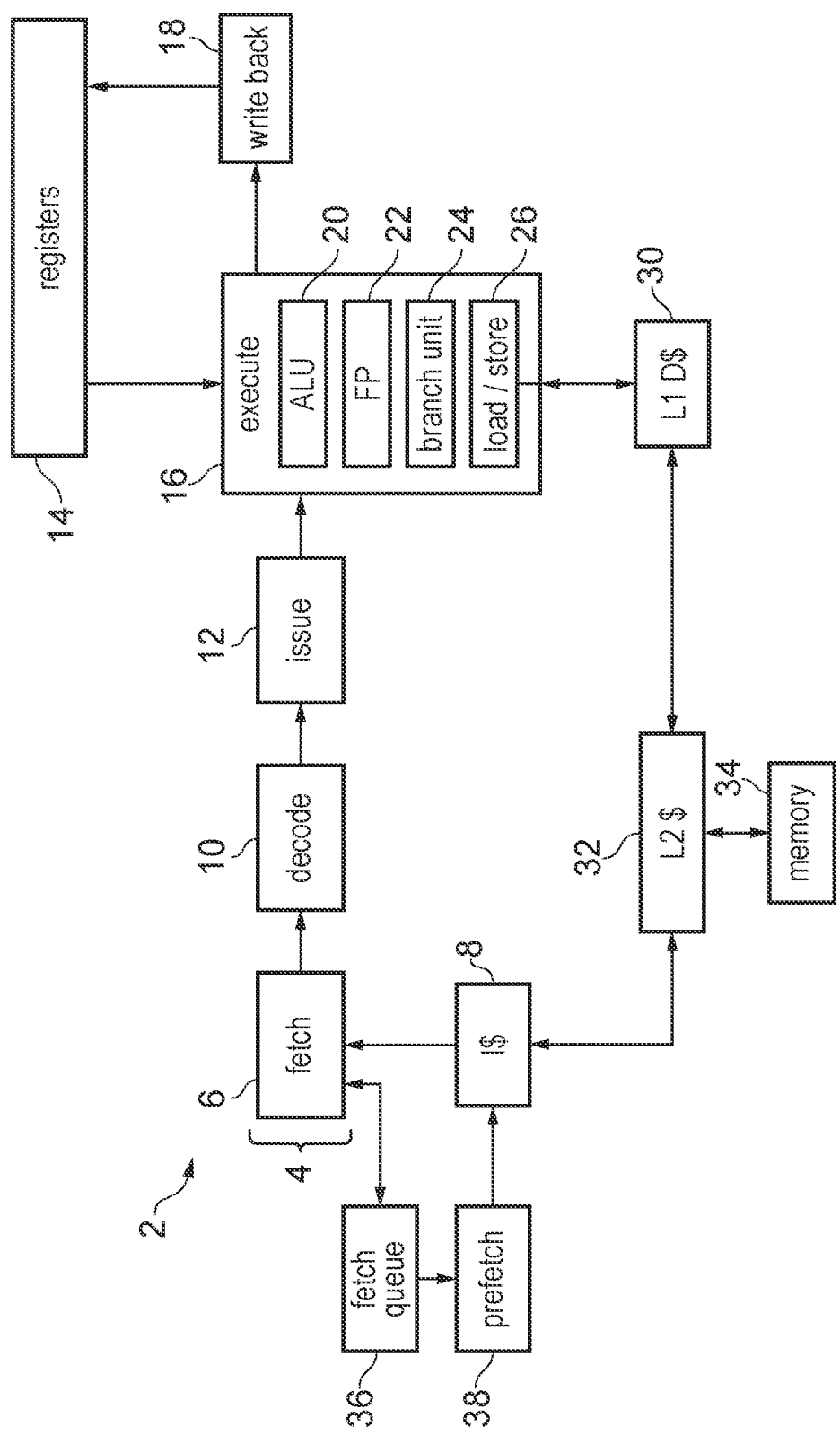
FIG. 1 schematically illustrates a data processing apparatus comprising an apparatus according to one aspect of the present techniques.

Before discussing the embodiments with reference to the accompanying figures, the following description of embodiments is provided.

In accordance with one example configuration there is provided an instruction fetch queue for storage of up to a maximum number of instruction fetch entries; prefetching circuitry configured, for each of the instruction fetch entries, to fetch an instruction indicated by that instruction fetch entry and to cause the instruction to be allocated to an instruction cache; and control circuitry configured to suppress allocation of a given instruction fetch entry to the instruction fetch queue in response to a number of the instruction fetch entries meeting or exceeding a limit value, wherein the limit value is less than the maximum number of entries.

When executing a program, a data processor is required to fetch instructions from memory in a specific order. Instructions that are fetched from memory can be stored in an instruction cache, which comprises a small amount of storage circuitry that can be accessed with less latency than an access to memory. In order to improve the performance of program execution, prefetching circuitry is provided to fetch an instruction from memory and to cause the instruction to be stored in the instruction cache before the instruction is explicitly required by the program. For example, the prefetching circuitry issues a prefetch request to the instruction cache, which then determines whether the instruction is currently held in the cache or not. If the instruction is currently held, then no further action is required. If the instruction is not currently held, then the request is forwarded towards memory (either directly to memory or via further levels of a memory hierarchy such as a level two cache) and the requested instruction is brought into the instruction cache. In this way, if the data processor requires that instruction, it can be fetched from the instruction cache and executed more quickly than if the instruction had to be fetched from memory.

The prefetching circuitry is driven by an instruction fetch queue containing instruction fetch entries. Each instruction fetch entry indicates a memory address, from which an instruction is to be fetched by the prefetching circuitry. In some examples, the instruction fetch queue comprises a First In, First Out (FIFO) buffer, such that the instruction fetch entries are arranged to indicate the instructions in program order. The instruction fetch entries may each indicate a virtual address or physical address, or may define an offset from a base address stored in, for example, a base register. In some examples, the instruction fetch entries each define the memory address of the instruction using the same format as the instruction cache.

In accordance with the present techniques, there is provided control circuitry which controls whether or not a new entry is allocated to the instruction fetch queue. In particular, a limit value is used to limit how many instruction fetch entries are permitted to be allocated to the instruction fetch queue at any one time. When a given instruction fetch entry is about to be allocated to the instruction fetch queue, the control circuitry determines how many instruction fetch entries are currently stored. If the number of instruction fetch entries meets or exceeds the limit value, the control circuitry suppresses allocation of the given instruction fetch entry. For example, if the instruction fetch queue has a maximum capacity of 64 instruction fetch entries, a limit value of 32 causes the control circuitry to suppress allocation of a given instruction fetch entry if the instruction fetch queue has 32 or more entries. This limits the effective size of the instruction fetch queue to 32 entries instead of 64 entries.

Suppressing the allocation of a given instruction fetch entry may be implemented using a simple signal assertion. In some examples, a binary signal is used by the control circuitry to assert an override causing the allocation of the given instruction fetch entry to the instruction fetch queue to not be performed.

By limiting the effective utilisation of the instruction fetch queue, the prefetching circuitry will prefetch fewer instructions from memory for storage in the instruction cache. Therefore, power consumption and cache/memory traffic can be controlled, such that larger workloads may make use of more prefetching to enhance performance, whereas smaller workloads may not require it, and power consumption and cache/memory traffic can be reduced accordingly.

In some examples, in response to fetching the instruction indicated by the instruction fetch entry, the prefetching circuitry is configured to cause a deallocation of the instruction fetch entry; and in response to the number of instruction fetch entries being less than the limit value after the deallocation, the control circuitry is configured to cause the given instruction fetch entry to be allocated to the instruction fetch queue. When the allocation of the given instruction fetch entry is suppressed, it is not discarded since it may still correspond to a useful instruction. Instead, the given instruction fetch entry is retained until the number of instruction fetch entries fall below the limit value. In particular, as the prefetching circuitry fetches instructions, the corresponding instruction fetch entries are deallocated, thus reducing the number of instruction fetch entries in the instruction fetch queue.

The control circuitry is responsive to the number of instruction fetch entries not exceeding the limit value to cause the given instruction fetch entry to be allocated to the instruction fetch queue. In some examples, the control circuitry continually or periodically determines the number of instruction fetch entries in the instruction fetch queue before determining whether to cause the given instruction fetch entry to be allocated. In other examples, the control circuitry is configured to determine the number of instruction fetch entries in response to the deallocation by the prefetching circuitry.

Deallocation of an instruction fetch entry may include invalidating, deleting or otherwise marking the instruction fetch entry as having been prefetched by the prefetching circuitry. Furthermore, the instruction fetch entry need not be immediately deallocated after a corresponding instruction is fetched from memory. In some examples, the instruction fetch entry is deallocated after the prefetched instruction has reached a particular point in a processing pipeline, such as when the corresponding instruction is decoded by a decoding unit.

In some examples, the limit value is dynamically modifiable. In particular, the limit value may be modified by hardware or software, for example by storing the limit value in a programmable register.

In some examples, there is provided event measurement circuitry configured to detect occurrences of one or more events; and determination circuitry configured to update the limit value based on the events detected. In such examples, the limit value is updated according to the current state of the apparatus. In particular, one or more events may be indicative that the limit value should be higher or lower, and the determination circuitry updates the limit value accordingly.

In some examples, the event measurement circuitry is configured to measure the number of occurrences of one or more events; and the determination circuitry is configured to update the limit value based on the number of occurrences of the one or more events within a measurement period. In such examples, the limit value can be updated at regular intervals defined by the measurement period, or at more arbitrary timings triggered by whether the events meet certain criteria. In some examples, the frequency of occurrence of the one or more events can be used to update the limit value. In particular, one or more events occurring more or less frequently may be indicative that the limit should be higher or lower, and the determination circuitry updates the limit value accordingly.

In some examples, the measurement period is a predetermined number of allocations to the instruction fetch queue. In such examples, it is recognised that an amount of time or a number of cycles is not always appropriate for the measurement period. In particular, while allocation of entries to the instruction fetch queue is suppressed by the control circuitry, the suppression may prevent the one or more events to be measured by the event measurement circuitry from occurring. Therefore, the events may not occur when they otherwise would have but for the suppression. By defining the measurement period by a predetermined number of allocations to the instruction fetch queue, the number of occurrences of the one or more events can be measured more consistently across each measurement period, regardless of whether the control circuitry suppresses allocation of a given instruction fetch entry or not.

In some examples, there is provided prediction circuitry configured to generate the given instruction fetch entry; and the one or more events are indicative of an increased risk in misprediction by the prediction circuitry. In such examples, the instruction fetch queue is populated by prediction circuitry based on a predicted instruction flow of the program. Hence, if the prediction circuitry were to mispredict the instruction flow of the program, the instruction fetch queue would be populated with entries corresponding to unnecessary instructions that are unlikely to be required (at this stage) to execute the program. This in turn causes the prefetching circuitry to prefetch unnecessary instructions to store in the instruction cache. On the other hand, if the prediction circuitry correctly predicts the instruction flow, then the instruction cache would be populated with useful instructions that are likely to be required (at this stage) to execute the program, and performance would be improved.

According to the above, it can be advantageous to control the limit value in dependence on how accurately the prediction circuitry is predicting the instruction flow. In particular, the one or more events measured by the event measurement circuitry are indicative of an increased risk of misprediction by the prediction circuitry. The determination circuitry may then determine a new value for the limit value based on the measured risk of misprediction, and update it accordingly as described above. In particular, where there is a higher risk of misprediction (i.e. the number of occurrences is greater), the limit value is decreased, and where there is a lower risk of misprediction (i.e. the number of occurrences is fewer), the limit value is increased.

In this way, the control circuitry described above limits the effective utilisation of the instruction fetch queue in dependence on the risk of misprediction by the prediction circuitry. Hence, when there is a high risk of misprediction, the effective utilisation of the instruction fetch queue is limited, and the prefetching circuitry prefetches fewer entries. As a result, fewer potentially mispredicted (and therefore unnecessary) instructions are allocated to the instruction cache, mitigating the eviction of potentially more useful instructions. On the other hand, if there is a low risk of misprediction, the effective utilisation of the instruction fetch queue is increased, resulting in more instructions being prefetched by the prefetching circuitry. Since the predicted instructions are more likely to be useful, there is a lower probability of an access to memory being required, thus improving performance.

In some examples, the prediction circuitry is configured to generate a further instruction fetch entry after the given instruction fetch entry has been allocated to the instruction fetch queue. In such examples, if the allocation of the given instruction fetch entry is suppressed by the control circuitry, the prediction circuitry does not continue to predict instructions to generate more instruction fetch entries, the allocation of which would also be suppressed.

In some examples, the control circuitry is configured to suppress allocation of the given instruction fetch entry to the instruction fetch queue by causing the prediction circuitry to stall. In such examples, the stall is explicitly caused by the control circuitry in order to prevent the prediction circuitry from needlessly generating further predictions, and hence wasting energy, while the allocation of an instruction fetch entry is suppressed.

In some examples, the one or more events comprises at least one of: a miss in the instruction cache, a miss in a branch target buffer, and a miss in a branch prediction buffer. Frequent misses in the instruction cache from instructions that are contiguous in program order may indicate that incorrect instruction fetch entries have been allocated to the instruction fetch queue, thus causing the prefetching circuitry to prefetch incorrect instructions. Since the instruction fetch entries are generated by the prediction circuitry, a miss in the instruction cache indicates a misprediction by the prediction circuitry. Accordingly, the event measurement circuitry is configured to count occurrences of a miss in the instruction cache.

When generating a prediction, the prediction circuitry may perform a look up in a branch target buffer (BTB). A BTB stores entries, each associating a memory address of a previously encountered taken branch instruction with the memory address of an instruction targeted by the taken branch. If a predicted instruction's memory address matches a memory address in the BTB, then the next instruction fetch entry is generated to correspond to the instruction at the target address. If the lookup in the BTB results in a miss, then the prediction circuitry may default to a prediction of not taken, and the next instruction fetch entry is generated to correspond to an instruction after the branch instruction in the sequence. It will be appreciated that since the prediction is based on a lack of information, there is a higher risk of misprediction compared to predictions based on a hit in the BTB. Accordingly, the event measurement circuitry is configured to count occurrences of a miss in the BTB.

The prediction circuitry may additionally or alternatively perform a lookup in a branch prediction buffer (BPB). A BPB stores entries, each associating a memory address of a previously encountered branch instruction with an indicator to indicate whether that branch instruction was taken or not taken. If a predicted instruction's memory address matches a memory address in the BPB, then the prediction circuitry generates a prediction according to the indicator (i.e. if the indicator indicates taken, then the instruction is predicted to be a taken branch instruction, and vice versa). If the lookup in the BPB results in a miss, then there is no record of the branch instruction, indicating that the predicted instruction is either not a branch instruction or a branch instruction that has not been encountered before. In such circumstances, the prediction circuitry may default to a prediction of not taken and then generates an instruction fetch entry corresponding to the next instruction in a sequence. As above, since the prediction is based on a lack of information, there is a higher risk of misprediction compared to predictions based on a hit in the BPB. Accordingly, the event measurement circuitry is configured to count occurrences of a miss in the BPB.

In some examples, the BTB only stores entries corresponding to 'taken' predictions, while entries corresponding to a 'not taken' prediction are not stored. It is recognised that any resulting misses that would correspond to a 'not taken' prediction would not be indicative of a risk in misprediction, and so such misses are not counted by the event measurement circuitry. In particular, a miss in the BTB may be counted only if there is a hit in the BPB and the hit entry predicts a 'taken' outcome for the branch instruction.

In some examples, there is provided sequence tracking circuitry configured to determine a number of contiguous instruction fetch entries for instructions that are contiguous in program order, wherein the control circuitry is configured to suppress allocation of the given instruction fetch entry to the instruction fetch queue in response to the number of contiguous instruction fetch entries meeting or exceeding the limit value.

The number of contiguous instruction fetch entries for instructions that are contiguous in program order may be referred to as a sequential run length. For programs with larger memory footprints, it is likely that the required instructions will exceed the capacity of the BTB. Therefore, it is useful to ensure that more of the instructions in the instruction cache are useful. In such cases, it is useful to track the sequential run length, since longer run lengths may be indicative of a misprediction having occurred (e.g. due to a BTB miss). It will be appreciated that the sequential run length may be smaller or larger than the total occupancy of the instruction fetch queue.

Similar to the techniques described above, the control circuitry is capable of suppressing the allocation of a given instruction fetch entry if the sequential run length exceeds the limit value. As discussed above, the prefetching circuitry will prefetch fewer instructions from memory for storage in the instruction cache, thus reducing the possibility of other (potentially more useful) instructions being evicted from the instruction cache. Accordingly the instruction prefetcher may be throttled in dependence on the sequential run length of the particular program being executed at a particular time.

In some examples, in response to fetching an instruction indicated by a corresponding instruction fetch entry, the prefetching circuitry is configured to cause a deallocation of the corresponding instruction fetch entry; and in response to the number of contiguous instruction fetch entries being less than the limit value after the deallocation, the control circuitry is configured to cause the given instruction fetch entry to be allocated to the instruction fetch queue. As described above, when the allocation of the given instruction fetch entry is suppressed, it is not discarded. Instead, the given instruction fetch entry is retained until the sequential run length falls below the limit value.

In some examples, the sequence tracking circuitry is configured to determine the number of contiguous instruction fetch entries based on a number of instruction fetch entries allocated to the instruction fetch queue since detecting a break in a predicted program flow. In such examples, it is assumed that the instruction fetch entries generated by the prediction circuitry follow a sequence unless there is a break in the predicted program flow. For example, after a prediction of a non-branch instruction or a branch instruction that is predicted as not taken, the prediction circuitry generates an instruction fetch entry corresponding to the next instruction that is contiguous in program order.

In some examples, the sequence tracking circuitry is configured to detect the break in the predicted program flow based on at least one of: an instruction fetch entry corresponding to a predicted taken branch instruction; and a pipeline flush. In such examples, a predicted taken branch instruction causes a break in the predicted program flow, since the next instruction would be the target instruction of the taken branch. The target instruction may be in a different region of memory or may be a previously executed instruction, and hence would not be contiguous in program order. Accordingly, the prediction circuitry generates an instruction fetch entry corresponding to the target instruction.

Furthermore, a pipeline flush signal is typically issued when execution circuitry detects that one or more instructions had been speculatively executed based on a misprediction. The pipeline flush signal causes any in-flight instructions in an execution pipeline (e.g. decode stage, rename stage, issue stage, etc) to be cleared. Additionally, the instruction fetch queue may also be flushed, causing every instruction fetch entry to be invalidated. The functionality of allocating new instruction fetch entries then restarts based on the now non-speculative state of the program. Since the contiguous instruction fetch entries would have been invalidated in response to the pipeline flush signal, the number of contiguous instruction fetch entries is reset to zero.

Particular embodiments will now be described with reference to the figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor an additional register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. In particular, the processing units include an arithmetic/logic unit (ALU) 20 for performing arithmetic or logical operations; a floating-point unit 22 for performing operations on floating-point values, a branch unit 24 for evaluating the outcome of branch operations and adjusting the program counter which represents the current point of execution accordingly; and a load/store unit 26 for performing load/store operations to access data in a memory system 8, 30, 32, 34. In this example the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

In accordance with the present techniques, there is provided an instruction fetch queue 36 comprising a plurality of instruction fetch entries each indicating a memory address of an instruction. The data processing apparatus 2 is further provided with prefetching circuitry 38 configured to prefetch instructions indicated by the instruction fetch entries, and to cause those instructions to be stored in the instruction cache 8. As a result, when the fetch unit 6 fetches that instruction, it will be already present in the instruction cache 8 and an access to the main system memory 34 will not be necessary.

Figure 2:
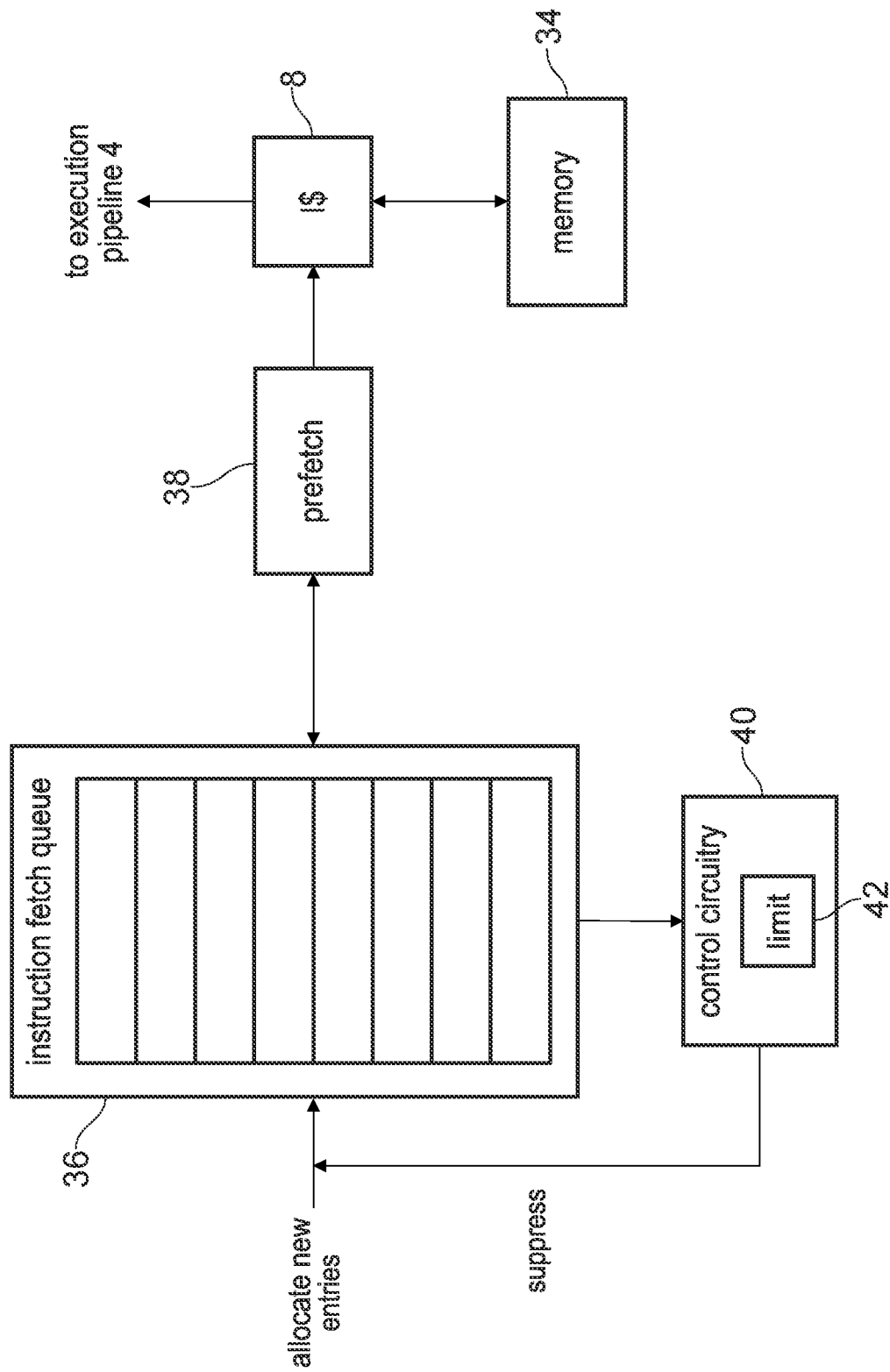
FIG. 2 schematically illustrates an apparatus according to one aspect of the present techniques.

FIG. 2 schematically illustrates more detail of the instruction fetch queue 36 according to the present techniques. In this example, the instruction fetch queue 36 comprises eight instruction fetch entries for ease of illustration, however, it will be appreciated that the instruction fetch queue 36 could comprise any number of instruction fetch entries. The instruction fetch queue 36 may allocate and deallocate entries using a First In, First Out (FIFO) queue, such that instructions are fetched in the order that the corresponding instruction fetch entries are allocated to the instruction fetch queue 36. An instruction fetch entry is deallocated by the prefetching circuitry 38 any time after an instruction corresponding to that entry has been fetched and stored in the instruction cache 8. In some examples, an instruction fetch entry is deallocated immediately after the corresponding instruction has been stored in the instruction cache 8. In other examples, an instruction fetch entry is deallocated when the instruction is decoded by the decode stage 10.

The instruction fetch queue 36 is coupled with control circuitry 40 which is capable of determining how many instruction fetch entries are currently allocated to the instruction fetch queue 36. The control circuitry 40 also stores a limit value 42, for example in a register, which may be programmable or determined by hardware. The limit value 42 may also be dynamically modified over time. The control circuitry 40 compares the limit value 42 to the number of instruction fetch entries currently allocated to the instruction queue 36. If the control circuitry 40 determines that the number of instruction fetch entries in the instruction fetch queue 36 meets or exceeds the limit value 42, the control circuitry 40 suppresses the allocation of any further instruction fetch entries. For example, if the limit value 42 was equal to four, then allocation of a new instruction fetch entry would be suppressed until fewer than four instruction fetch entries are allocated in the instruction fetch queue 36. Therefore, the instruction fetch queue 36 is effectively resized from eight entries to four entries.

By resizing the instruction fetch queue 36, it is possible to control how many instructions the prefetching circuitry 38 can prefetch into the instruction cache 8. Therefore the power usage and cache traffic that results from the prefetching functionality can be throttled as appropriate for a particular workload in order to improve the overall efficiency of the data processing apparatus 2.

Figure 3:
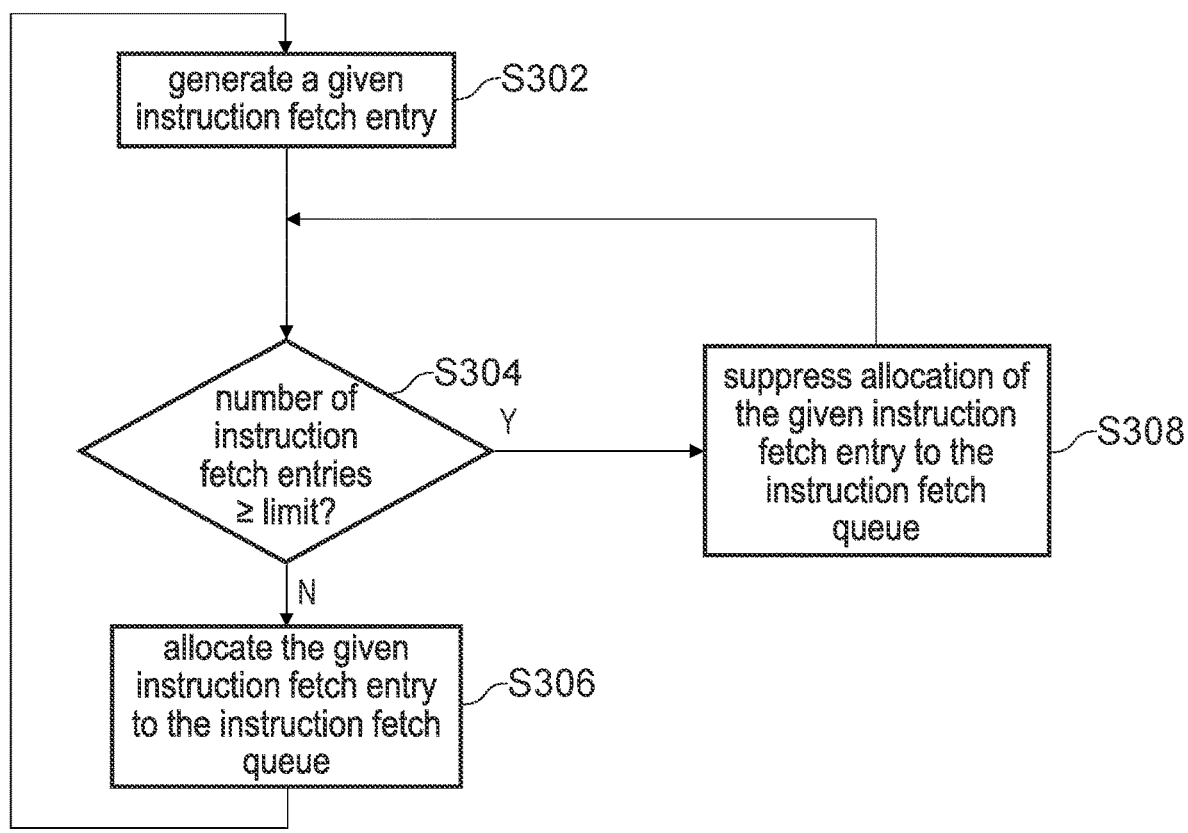
FIG. 3 shows a flow diagram for allocating entries to an instruction fetch queue, according to one aspect of the present techniques.

FIG. 3 illustrates a flow diagram for the functionality of an apparatus such as in FIG. 2. At S302, a given instruction fetch entry is generated for allocation to the instruction fetch queue 36. At S304, the control circuitry 40 determines whether the number of instruction fetch entries currently allocated in the instruction fetch queue meets or exceeds a limit value. If not (i.e. N at S304), then at S306, the given instruction fetch entry is allocated to the fetch queue 36, and the next instruction fetch entry is generated. However, if the number of instruction fetch entries meets or exceeds the limit value (i.e. Y at S304) then the control circuitry 40 suppresses the allocation of the given instruction fetch entry to the instruction fetch queue 36 at S308. The allocation is suppressed until the number of instruction fetch entries is less than the limit value 42. In particular, existing instruction fetch entries will be deallocated over time as the program is executed. For example, an instruction fetch entry is deallocated in response to the corresponding instruction being fetched from memory 34 or being decoded by the decode stage 10. S304 is repeated to determine whether the number of instruction fetch entries meet or exceed the limit value 42. If so, then control circuitry 40 continue to suppress the allocation of the given fetch entry at S308. It will be appreciated that S304 and S308 may be repeated any number of times until the number of instruction fetch entries is less than the limit value 42 at S304, at which point the given instruction fetch entry is allocated to the instruction fetch queue 36 at S306 and the next instruction fetch entry can be generated at S302.

Figure 4:
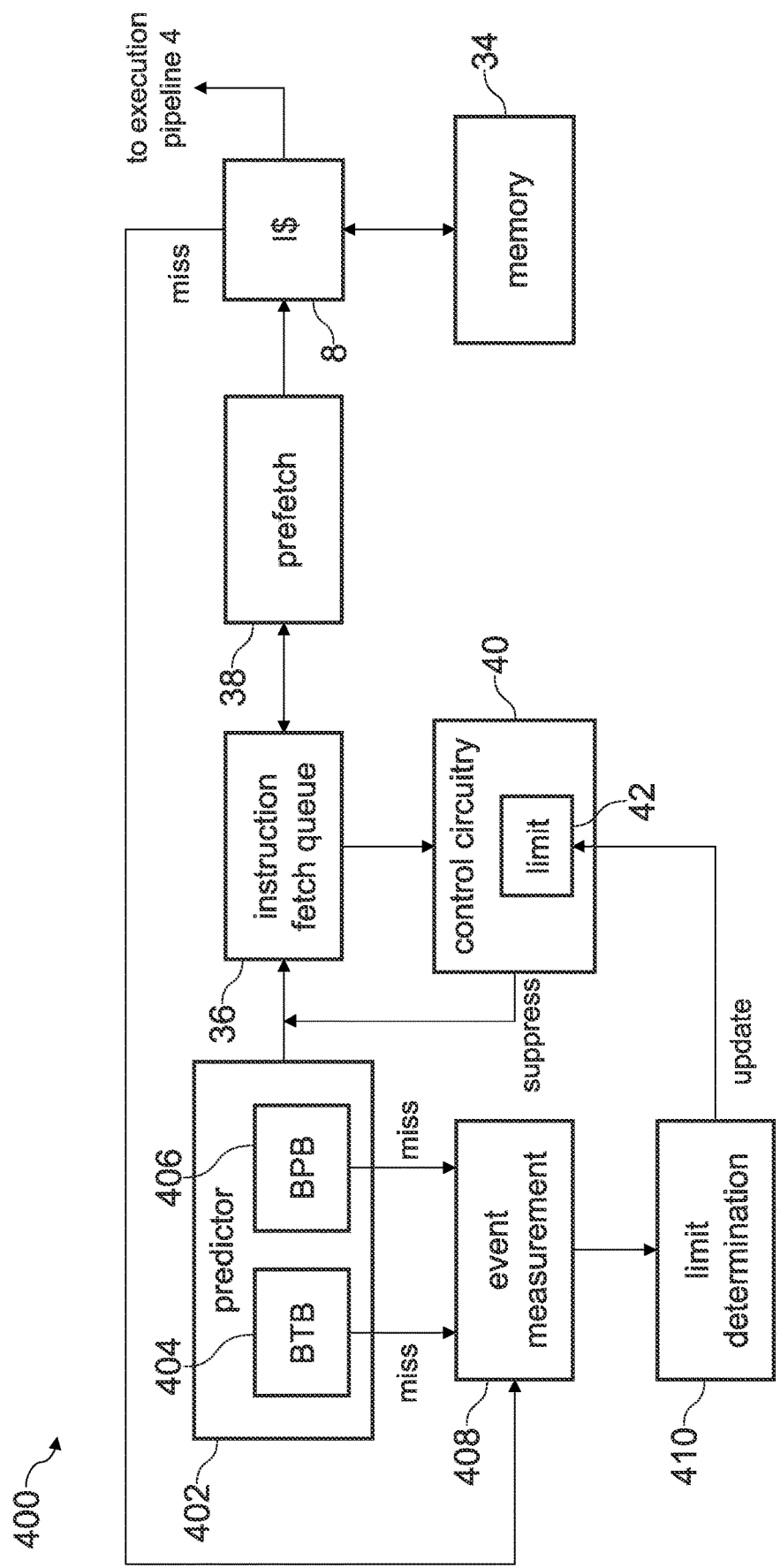
FIG. 4 schematically illustrates an embodiment of an apparatus according to one aspect of the present techniques.

FIG. 4 schematically illustrates an example apparatus 400 according to the present techniques. The apparatus 400 comprises prediction circuitry 402 configured to predict whether a block of instructions comprises a branch instruction, whether a branch instruction is expected to be taken or not taken, and the target of any taken branch instructions. Using these predictions, the prediction circuitry 402 generates corresponding instruction fetch entries for allocation to the instruction fetch queue 36. Some instructions may be branch instructions, and the prediction circuitry 402 is configured to predict the outcome of the branch instructions. In particular, the prediction circuitry 402 comprises a branch target buffer (BTB) 404 for predicting the target of a taken branch instruction and a branch prediction buffer (BPB) 406 for predicting a taken or not taken outcome for a particular branch instruction. It will be appreciated that the prediction circuitry 402 may include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios.

The prediction circuitry 402 receives signals from the branch unit 24 (in FIG. 1) indicating actual branch outcomes of branch instructions, such as an indication of whether an instruction was a branch instruction, whether such a branch instruction was taken, and if so the target address of that branch instruction. This information is provided to the BTB 404 and BPB 406 accordingly so that a correct prediction is more likely to be made if the same block of instructions is encountered again. If the prediction circuitry 402 has not been provided with the necessary information to make a prediction, a default prediction may be generated. For example, without information indicating the contrary, the prediction circuitry 402 defaults to a prediction of not present or not taken.

When the prediction circuitry 402 generates an instruction fetch entry, the instruction fetch entry is then sent to the instruction fetch queue 36, where the allocation may be suppressed by the control circuitry 40 in a similar way as in previous examples. If the allocation is suppressed, then the prediction circuitry 402 is stalled until that instruction fetch entry has been allocated to the instruction fetch queue 36. After that instruction fetch entry has been allocated, the prediction circuitry 402 generates the next instruction fetch entry.

In the apparatus 400, the limit value 42 is capable of being dynamically modified based on a risk of misprediction by the prediction circuitry 402. In particular, event measurement circuitry 408 is provided to measure a risk of misprediction by the prediction circuitry 402, and limit determination circuitry 410 is provided to determine a limit value 42 based on the risk of misprediction measured by the event measurement circuitry 408.

A risk of misprediction may be measured in several different ways. For example, frequent misses in the instruction cache 8 for instructions that are contiguous in program order may indicate a misprediction by the prediction circuitry 402, since the required instructions have not been prefetched by the prefetching circuitry 38. In some examples the instruction cache 8 is provided with a fill buffer to temporarily hold data that has been fetched from memory 34 after a miss in the instruction cache 8. The data in the fill buffer is then allocated to the instruction cache 8 when there is space (e.g. after an eviction or invalidation of existing cache data if necessary). In such examples, an indication of an allocation to the fill buffer may be used as an indication of a miss occurring in the instruction cache 8. Additionally, a miss in either of the BTB 404 or BPB 406 would be indicative of a branch instruction either not being recognised or a default prediction being generated as described above. Since such a prediction would be made based on a lack of information there is an increased risk that the prediction would be incorrect. The event measurement circuitry 408 is configured to count the received signals indicative of a miss occurring in each of the BTB 404, BPB 406 and the instruction cache 8.

It will be appreciated that the event measurement circuitry 408 does not need to measure a number of misses in all of the BTB 404, BPB 406 and instruction cache 8. In some examples, the event measurement circuitry 408 only counts misses in one or two of them. Furthermore, the event measurement circuitry 408 may receive signals indicative of an increased risk of a misprediction from any other prediction structures in the prediction circuitry 402, such as an estimation of the confidence in a particular prediction. Still furthermore, the event measurement circuitry 408 may receive signals indicative of a miss in other data structures outside of the prediction circuitry 402, such as an instruction translation lookaside buffer.

The risk of misprediction can then be measured by the number of misses that occur, as described above, within a predetermined measurement period. In some examples, the predetermined measurement period is a predetermined number of allocations to the instruction fetch queue 36. In this example at the end of a predetermined measurement period, the event measurement circuitry 408 outputs the measured number of misses in each of the BTB 404, BPB 406 and instruction cache 8 to the limit determination circuitry 410. The limit determination circuitry 410 is configured to generate an updated limit value 42 in dependence on the risk of misprediction. In particular, when there is a higher risk of misprediction, the limit determination circuitry 410 is configured to reduce the limit value 42 so as to mitigate the likelihood of the prefetching circuitry 38 being caused to fetch unnecessary instructions from memory 34, resulting in potentially useful instructions being evicted from the instruction cache 8. Conversely, when there is a lower risk of misprediction, the limit determination circuitry is configured to increase the limit value 42 so as to make us of the performance advantages of prefetching instructions and reducing the possibility of an access to memory 34 being necessary. The limit determination circuitry 410 may determine a limit value 42 in many different ways. In some examples, a table may be provided, such that a measured risk of misprediction falling within one of a plurality of ranges is mapped to one of a plurality of possible limit values. In other examples, a mathematical relationship may be defined between the measured risk of misprediction and the limit value 42. For example, the limit value 42 could be equal to a product of the measured number of misses and another predetermined number.

The following example pseudo-code is provided to illustrate the functionality of the event measurement circuitry 408, where the instruction fetch queue 36 has a maximum capacity of 64 instruction fetch entries:

```
For every FQ alloc
    fq_alloc_period++; // count allocation to fill queue in
        current measurement period
For every I$ miss
    ic_miss_period++; // count instruction cache misses in
        current measurement period
For every BTB miss for taken branch
    btb_miss_period++; // count the BTB misses in current
        measurement period
For every 10K FB alloc // 10K FB allocations = measurement period
    icpfq = ic_miss_period / fq_alloc_period;
    // determine I$ metric in limit determination circuitry
    btb_misspfq = btb_miss_period / fq_alloc_period
    // determine BTB metric in limit determination circuitry
    if btb_misspfq >= 0.018
        most_aggr_seq_limit = 4;
        mid_aggr_seq_limit = 8;
    else
        most_aggr_seq_limit = 8;
        mid_aggr_seq_limit = 24;
    if icpfq >= 0.14
        SEQ_LIMIT = most_aggr_seq_limit;
        // most aggressive throttling
    else if icpfq =< 0.005
        SEQ_LIMIT = 64;
        // full FQ utilization (no throttling)
    else
        SEQ_LIMIT = mid_aggr_seq_limit;
        // medium throttling
    fq_alloc_period = 0; // reset for next measurement period
    ic_miss_period = 0; // reset for next measurement period
    btb_miss_period = 0; // reset for next measurement period
```

Figure 5:
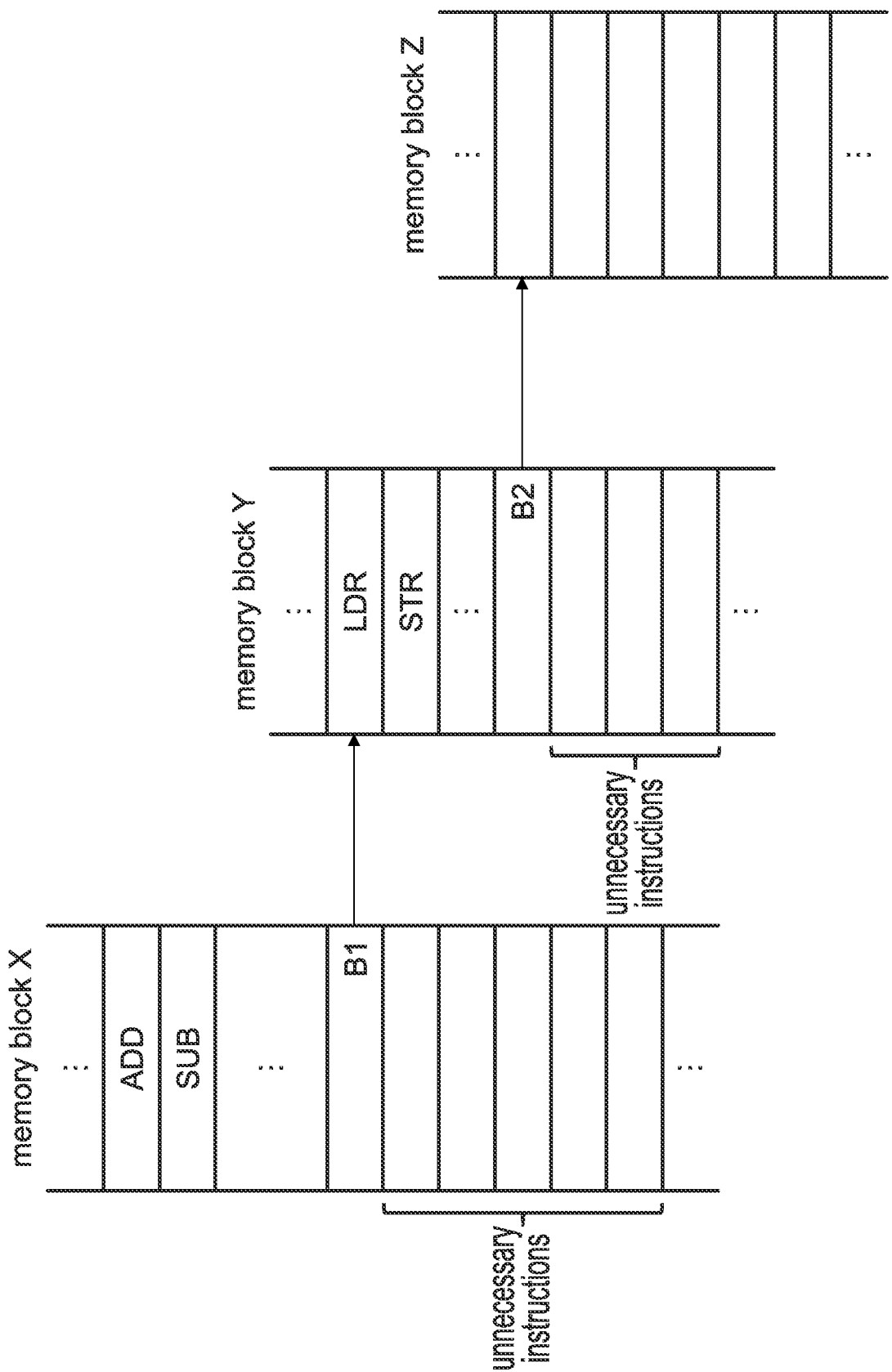
FIG. 5 illustrates program flow through instructions stored in memory.

FIG. 5 illustrates an example program flow through instructions stored in memory 34. The program flow begins at the top of memory block X. The prediction circuitry 402 then predicts instructions in a sequential order, such that each instruction fetch entry indicates a memory address of an instruction in a regular sequence. Hence, the prediction circuitry 402 generates instruction fetch entries corresponding to the ADD instruction, followed by the SUB instruction and so on. As in previous examples, the prefetching circuitry 38 uses the instruction fetch entries to prefetch instructions to be stored in the instruction cache 8.

Later in memory block X, there is a branch instruction B1, which targets the memory address of the LDR instruction in memory block Y. If the prediction circuitry 402 correctly recognises and predicts a taken outcome for the branch instruction B1, then the next instruction fetch entry to be generated will correspond to the LDR instruction in memory block Y, followed by the STR instruction and so on. Accordingly, the prefetching circuitry 38 will begin prefetching instructions from memory block Y. However, if the prediction circuitry 402 does not correctly predict the outcome of branch instruction B1 (either by not recognising the branch instruction or by predicting a not taken outcome), then the next instruction fetch entry to be generated will correspond to the instruction after the branch in memory block X. Therefore, the prefetching circuitry 38 causes those unnecessary instructions to be fetched from memory block X and stored into the instruction cache 8. It will be appreciated that, since the branch is supposed to be taken, those instructions after the branch will be unnecessary for the execution of the program, resulting in potentially more useful instructions being evicted.

It will be appreciated that the above problem has the possibility of occurring at every branch instruction, such as the branch instruction B2 later in memory block Y that targets an instruction in memory block Z. In the same way as previously described, the instructions positioned after the branch instruction B2 in memory block Y will be unnecessary for the program.

Figure 6:
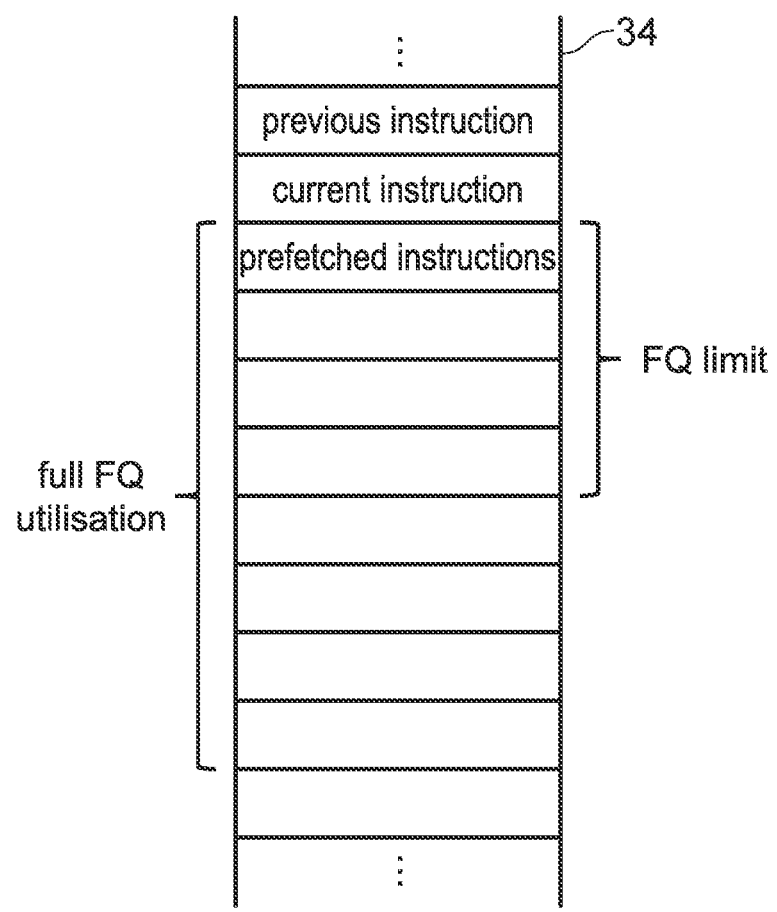
FIG. 6 illustrates a comparison of full instruction fetch queue usage and limited instruction fetch queue usage.

FIG. 6 illustrates how resizing the instruction fetch queue 36 based on the limit value 42 reduces the number of unnecessary instructions that would be fetched from memory 34 by the prefetching circuitry 38. In particular, when there is full utilisation of the instruction fetch queue 36 (in this example, the instruction fetch queue 36 contains eight entries), the prefetching circuitry 38 prefetches eight further instructions after the current instruction. Conversely, when the instruction fetch queue 36 is limited by the limit value 42 (in this example, the limit value 42 is equal to four), the prefetching circuitry 38 only prefetches four further instructions after the current instruction. Therefore, if there is a misprediction, fewer unnecessary instructions will have been stored in the instruction cache 8 by the prefetching circuitry 38, and hence fewer potentially more useful instructions will have been evicted from the instruction cache 8.

Figure 7:
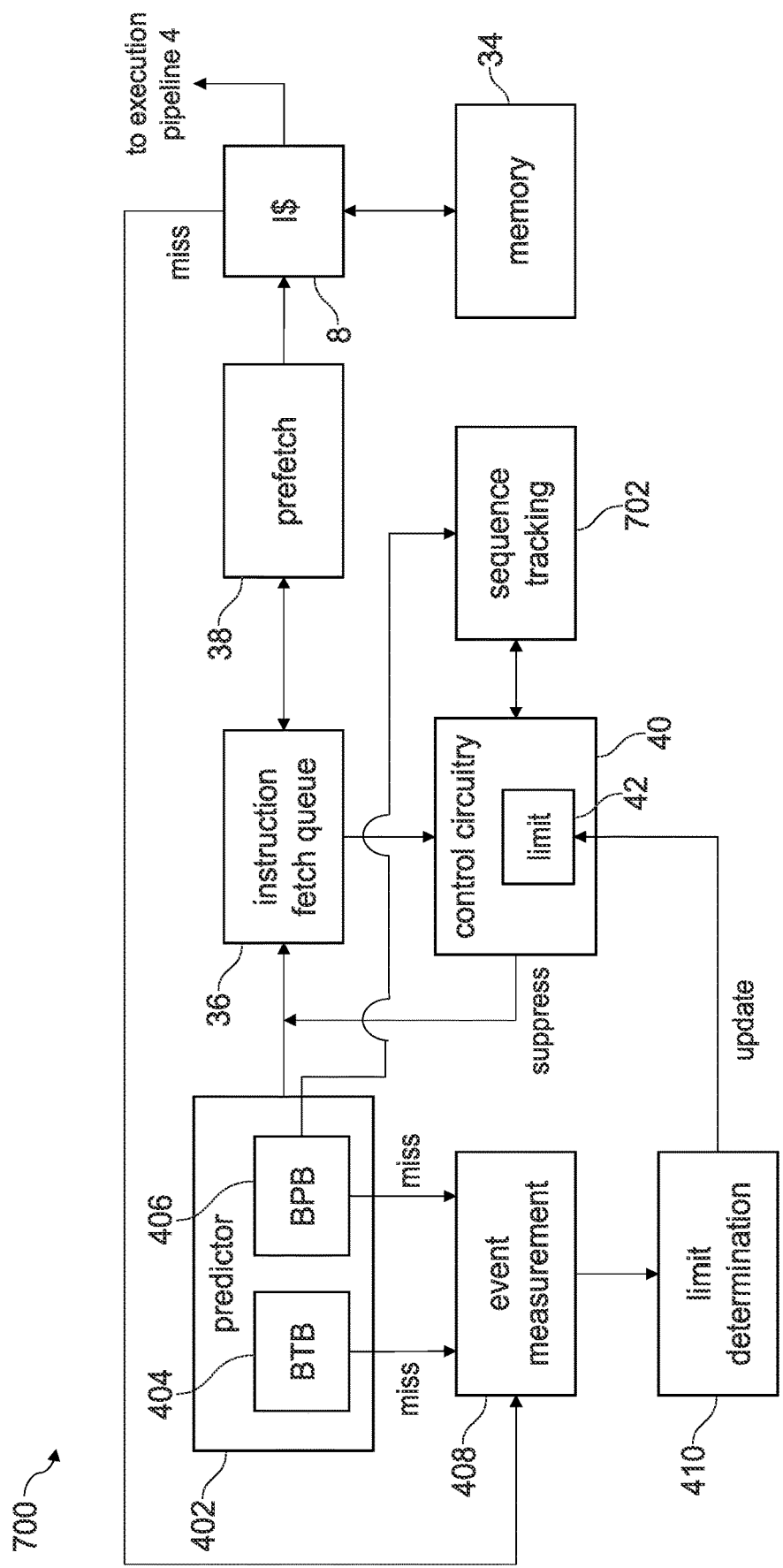
FIG. 7 schematically illustrates an embodiment of an apparatus according to one aspect of the present techniques.

FIG. 7 schematically illustrates an example apparatus 700 according to the present techniques. The apparatus 700 comprises similar components to the apparatus 400 described previously, and additionally comprises sequence tracking circuitry 702. The sequence tracking circuitry 702 is configured to determine a sequential run length of instruction fetch entries in the instruction fetch queue 36. The sequential run length is equal to the number of instructions between branch instructions, e.g. it is the number of contiguous instruction fetch entries that are contiguous in program order until a branch or control flow instruction is encountered and can be determined from the instruction stream. For example, instruction fetch entries generated for the instructions in memory block Y in FIG. 5 would have a sequential run length equal to the number of instructions between the LDR instruction and the taken branch instruction B2.

The sequence tracking circuitry 702 is coupled with the control circuitry 40, and the control circuitry 40 is further configured to suppress allocation of an instruction fetch entry if the sequential run length meets or exceeds the limit value 42. In some examples, the control circuitry 40 suppresses the allocation of an instruction fetch entry if either of the total number of entries or the sequential run length meets or exceeds the limit value 42. In other examples, the control circuitry 40 only suppresses the allocation of an instruction fetch entry if both of the total number of entries and the sequential run length meet or exceed the limit value 42.

The sequence tracking circuitry 702 receives information from the prediction circuitry 402 indicative of each prediction made by the prediction circuitry 402 in order to detect when the prediction circuitry 402 predicts a break in sequential program flow (e.g. a prediction of a taken branch instruction). The sequence tracking circuitry 702 also receives information relating to pipeline flushes, which also cause a break in sequential program flow by virtue of the program being 'rewound', e.g. in response to a misprediction. Hence, the sequential run length may be determined from the number of instruction fetch entries allocated between each break in the sequential program flow.

Figure 8:
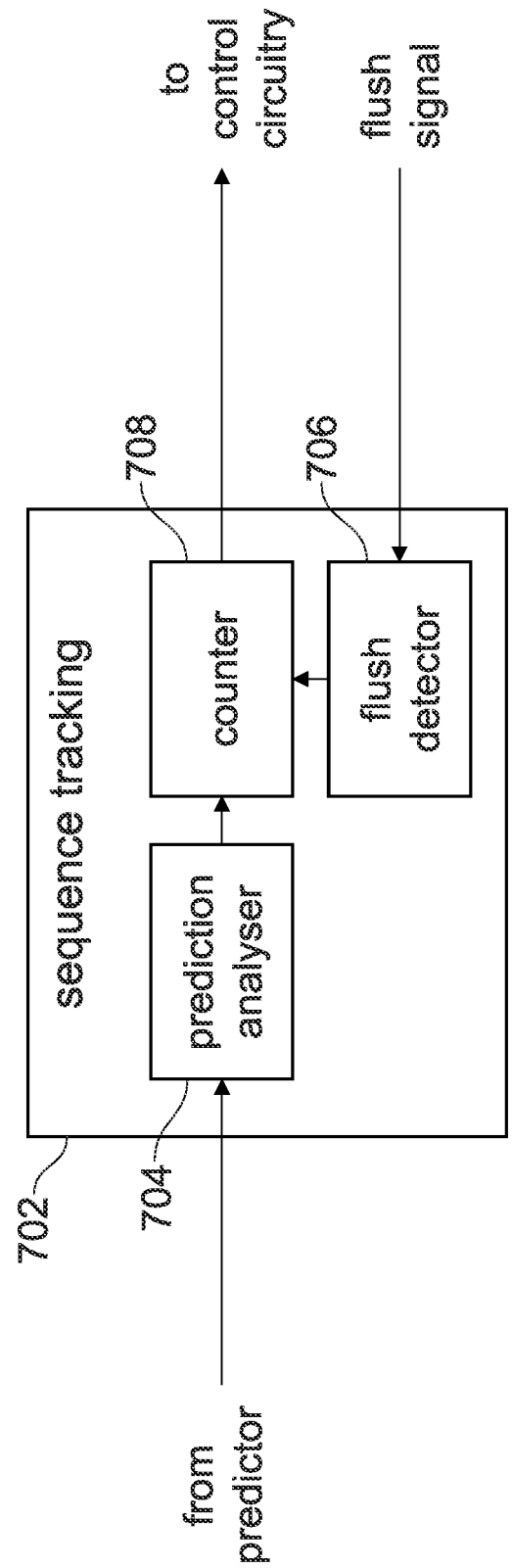
FIG. 8 schematically illustrates sequence tracking circuitry.

FIG. 8 illustrates a detailed example of the sequence tracking circuitry 702 comprising a prediction analyser 704 and a flush detector 706, which are used to control a counter 708. The prediction analyser 704 receives a signal from the prediction circuitry 402 in order to determine whether a predicted instruction is a taken branch instruction, a not taken branch instruction or a non-branch instruction. This prediction may be determined based on information stored in the BPB 406. If the prediction is anything other than a taken branch instruction, then an instruction fetch entry generated from that prediction will be added to the sequential run length, hence the counter 708 is incremented. On the other hand, if the prediction is a taken branch instruction, then a break in the predicted program flow is detected, and the counter 708 is reset to zero. Additionally, if a pipeline flush is initiated in the processing pipeline 4, for example in response to an incorrect prediction being detected in the branch unit 24, the instruction fetch queue 36 is also flushed. This also represents a break in the predicted program flow, and the counter 708 is reset to zero.

The value of the counter 708 represents the number of contiguous instruction fetch entries for instructions that are contiguous in program order. Therefore, as described above with reference to FIG. 7, the control circuitry 40 compares the value of the counter 708 to the limit value 42 in order to determine whether to suppress allocation of an instruction fetch entry to the instruction fetch queue 36.

Figure 9:
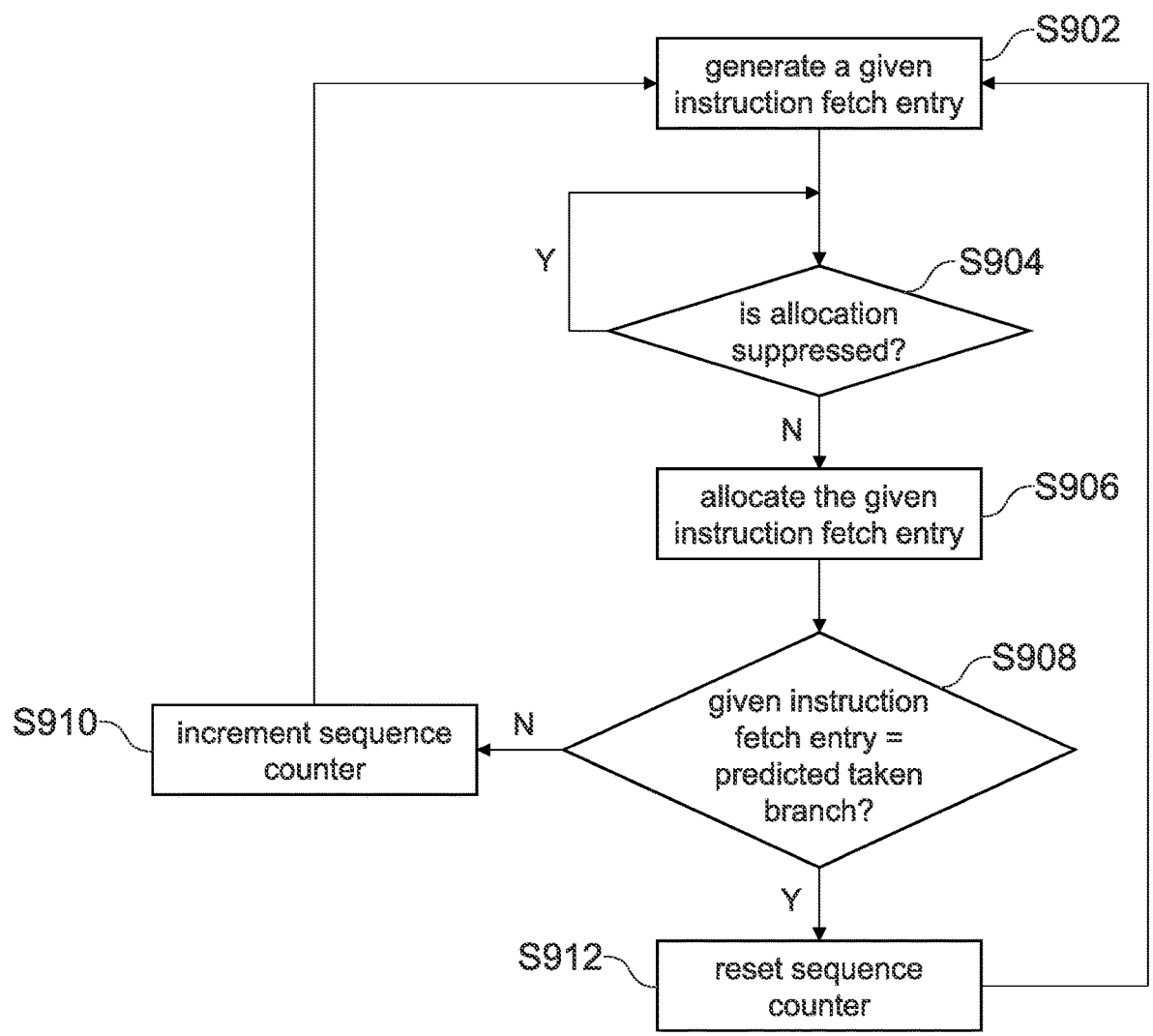
FIG. 9 shows a flow diagram for the operation of the sequence tracking circuitry.

FIG. 9 illustrates a flow diagram for determining the number of contiguous instruction fetch entries for instructions that are contiguous in program order. The process begins at S902 where a given instruction fetch entry is generated. At S904 the control circuitry 40 determines whether to suppress allocation of the given instruction fetch entry, as described in previous examples. If so (i.e. Y at S904), then allocation of the given instruction fetch entry is suppressed until the control circuitry 40 determines that the allocation should no longer be suppressed. When allocation is not suppressed (i.e. N at S904), then the given instruction fetch entry is allocated to the instruction fetch queue 36 at S906. In response to the allocation of the given fetch entry, it is determined whether the given instruction fetch entry was a predicted taken branch instruction by the prediction analyser 704 in the sequence tracking circuitry 702. If the given instruction fetch entry is not a predicted taken branch instruction (i.e. either a not taken branch instruction, or a non-branch instruction) then the counter 708 is incremented at S910. If the given instruction fetch entry is a predicted taken branch instruction, then a break in the predicted program flow is detected, and the counter 708 is reset at S912. After incrementing or resetting the counter 708, the process then restarts when the next instruction fetch entry is generated at S902. Furthermore, although not illustrated, if a pipeline flush signal is received at any point in the process of FIG. 9, the counter 708 is reset and the process restarts at S902.

The following example pseudo-code is provided to illustrate the functionality of the apparatus 700:

```
For every prediction or pipeline flush // determine sequence run length
    If any taken or pipeline flush
        seq_count = 0; // reset counter
        throttling_mode = false;
    else
        seq_count++; // increment counter
For every cycle
    if seq_count >= SEQ_LIMIT // determination by control circuitry
        throttling_mode = true;
        fq_dyn_size = cur_fq_size;
    if throttling_mode && fq_size >= fq_dyn_size
        stall prediction; // allocation suppressed
    else
        continue prediction; // allocation not suppressed
```

As in the apparatus 400, the event measurement circuitry 408 and limit determination circuitry 410 allow for the limit value 42 (i.e. SEQ_LIMIT) to be varied in dependence on the measured risk of misprediction by the prediction circuitry 402.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 10:
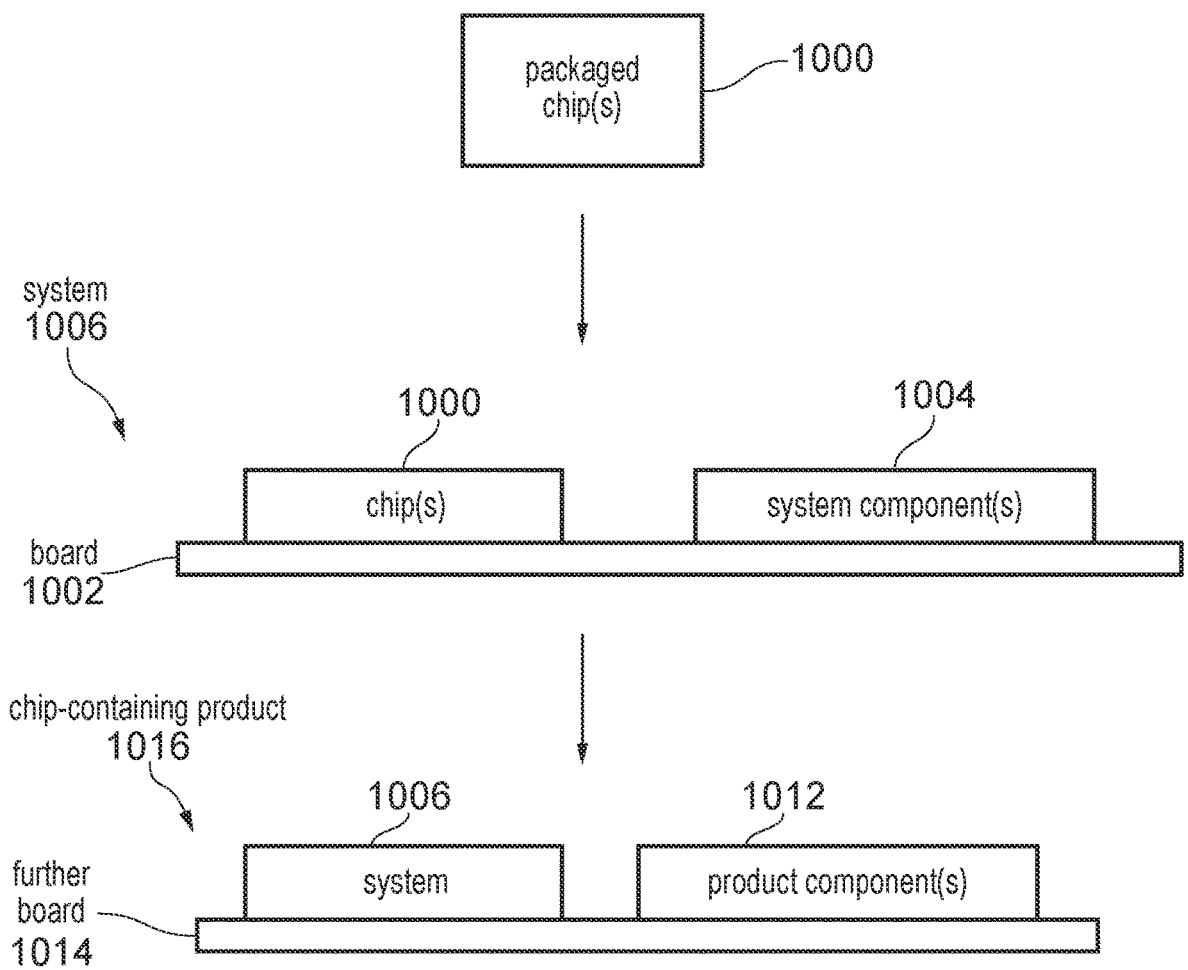
FIG. 10 illustrates a system and a chip-containing product.

As shown in FIG. 10, one or more packaged chips 1000, with the apparatus described above implemented on one chip or distributed over two or more of the chips, are manufactured by a semiconductor chip manufacturer. In some examples, the chip product 1000 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 1000 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 1000 are assembled on a board 1002 together with at least one system component 1004. For example, the board may comprise a printed circuit board. The board substrate may be made of any of a variety of materials, e.g. plastic, glass, ceramic, or a flexible substrate material such as paper, plastic or textile material. The at least one system component 1004 comprises one or more external components which are not part of the one or more packaged chip(s) 1000. For example, the at least one system component 1004 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 1010 is manufactured comprising the system 1006 (including the board 1002, the one or more chips 1000 and the at least one system component 1004) and one or more product components 1012. The product components 1012 comprise one or more further components which are not part of the system 1006. As a non-exhaustive list of examples, the one or more product components 1012 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 1006 and one or more product components 1012 may be assembled on to a further board 1014.

The board 1002 or the further board 1014 may be provided on or within a device housing or other structural support (e.g. a frame or blade) to provide a product which can be handled by a user and/or is intended for operational use by a person or company.

The system 1006 or the chip-containing product 1016 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Some examples are set out in the following clauses:

(1) An apparatus comprising:
an instruction fetch queue for storage of up to a maximum number of instruction fetch entries;
prefetching circuitry configured, for each of the instruction fetch entries, to fetch an instruction indicated by that instruction fetch entry and to cause the instruction to be allocated to an instruction cache; and
control circuitry configured to suppress allocation of a given instruction fetch entry to the instruction fetch queue in response to a number of the instruction fetch entries meeting or exceeding a limit value, wherein the limit value is less than the maximum number of entries.

(2) The apparatus of clause (1), wherein
in response to fetching the instruction indicated by the instruction fetch entry, the prefetching circuitry is configured to cause a deallocation of the instruction fetch entry; and
in response to the number of instruction fetch entries being less than the limit value after the deallocation, the control circuitry is configured to cause the given instruction fetch entry to be allocated to the instruction fetch queue.

(3) The apparatus of clause (1) or clause (2), wherein
the limit value is dynamically modifiable.

(4) The apparatus of clause (3), comprising:
event measurement circuitry configured to detect occurrences of one or more events; and
determination circuitry configured to update the limit value based on the events detected.

(5) The apparatus of clause (4), wherein
the event measurement circuitry is configured to measure a number of occurrences of one or more events; and
the determination circuitry is configured to update the limit value based on the number of occurrences of the one or more events within a measurement period.

(6) The apparatus of clause (5), wherein
the measurement period is a predetermined number of allocations to the instruction fetch queue.

(7) The apparatus of any of clauses (4) to (6), comprising:
prediction circuitry configured to generate the given instruction fetch entry,
wherein the one or more events are indicative of an increased risk of misprediction by the prediction circuitry.

(8) The apparatus of clause (7), wherein
the prediction circuitry is configured to generate a further instruction fetch entry after the given instruction fetch entry has been allocated to the instruction fetch queue.

(9) The apparatus of clause (7) or clause (8), wherein
the control circuitry is configured to suppress allocation of the given instruction fetch entry to the instruction fetch queue by causing the prediction circuitry to stall.

(10) The apparatus of any of clauses (7) to (9), wherein
the one or more events comprises at least one of:
a miss in the instruction cache,
a miss in a branch target buffer, and
a miss in a branch prediction buffer.

(11) The apparatus of any of clauses (1) to (10), comprising:
sequence tracking circuitry configured to determine a number of contiguous instruction fetch entries for instructions that are contiguous in program order, wherein
the control circuitry is configured to suppress allocation of the given instruction fetch entry to the instruction fetch queue in response to the number of contiguous instruction fetch entries meeting or exceeding the limit value.

(12) The apparatus of clause (11), wherein
in response to fetching an instruction indicated by a corresponding instruction fetch entry, the prefetching circuitry is configured to cause a deallocation of the corresponding instruction fetch entry; and
in response to the number of contiguous instruction fetch entries being less than the limit value after the deallocation, the control circuitry is configured to cause the given instruction fetch entry to be allocated to the instruction fetch queue.

(13) The apparatus of clause (11) or clause (12), wherein
the sequence tracking circuitry is configured to determine the number of contiguous instruction fetch entries based on a number of instruction fetch entries allocated to the instruction fetch queue since detecting a break in a predicted program flow.

(14) The apparatus of clause (13), wherein
the sequence tracking circuitry is configured to detect the break in the predicted program flow based on at least one of:
an instruction fetch entry corresponding to a predicted taken branch instruction; and
a pipeline flush.

(15) A system comprising:
the apparatus of any preceding clause, implemented in at least one packaged chip;
at least one system component; and
a board,
wherein the at least one packaged chip and the at least one system component are assembled on the board.

(16) A chip-containing product comprising the system of clause (15) assembled on a further board with at least one other product component.

(17) A method comprising:
   storing up to a maximum number of instruction fetch entries;
   for each of the instruction fetch entries, fetching an instruction indicated by that instruction fetch entry and causing the instruction to be allocated to an instruction cache; and
   suppressing allocation of a given instruction fetch entry in response to a number of instruction fetch entries meeting or exceeding a limit value, wherein the limit value is less than the maximum number of entries.

(18) A non-transitory computer-readable medium to store computer-readable code for fabrication of an apparatus comprising:
   an instruction fetch queue for storage of up to a maximum number of instruction fetch entries;
   prefetching circuitry configured, for each of the instruction fetch entries, to fetch an instruction indicated by that instruction fetch entry and to cause the instruction to be allocated to an instruction cache; and
   control circuitry configured to suppress allocation of a given instruction fetch entry to the instruction fetch queue in response to a number of the instruction fetch entries meeting or exceeding a limit value, wherein the limit value is less than the maximum number of entries.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
   an instruction fetch queue for storage of instruction fetch entries;
   prefetching circuitry configured, for each of the instruction fetch entries, to fetch an instruction indicated by that instruction fetch entry and to cause the instruction to be allocated to an instruction cache; and
   control circuitry configured to suppress allocation of a further instruction fetch entry to the instruction fetch queue in response to a number of the instruction fetch entries meeting or exceeding a limit value, wherein the limit value is less than a storage capacity of the instruction fetch queue.

2. The apparatus of claim 1, wherein
   in response to fetching the instruction indicated by the instruction fetch entry, the prefetching circuitry is configured to cause a deallocation of the instruction fetch entry; and
   in response to the number of instruction fetch entries being less than the limit value after the deallocation, the control circuitry is configured to cause the further instruction fetch entry to be allocated to the instruction fetch queue.

3. The apparatus of claim 1, wherein
the limit value is dynamically modifiable.

4. The apparatus of claim 3, comprising:
event measurement circuitry configured to detect occurrences of one or more events; and
determination circuitry configured to update the limit value based on the events detected.

5. The apparatus of claim 4, wherein:
the event measurement circuitry is configured to measure the number of occurrences of one or more events; and
the determination circuitry is configured to update the limit value based on the number of occurrences of the one or more events within a measurement period.

6. The apparatus of claim 5, wherein
the measurement period is a predetermined number of allocations to the instruction fetch queue.

7. The apparatus of claim 4, comprising:
prediction circuitry configured to generate the further instruction fetch entry,
wherein the one or more events are indicative of an increased risk of misprediction by the prediction circuitry.

8. The apparatus of claim 7, wherein
the prediction circuitry is configured to generate a further instruction fetch entry after the further instruction fetch entry has been allocated to the instruction fetch queue.

9. The apparatus of claim 7, wherein
the control circuitry is configured to suppress allocation of the further instruction fetch entry to the instruction fetch queue by causing the prediction circuitry to stall.

10. The apparatus of claim 7, wherein
the one or more events comprises at least one of:
   a miss in the instruction cache,
   a miss in a branch target buffer, and
   a miss in a branch prediction buffer.

11. The apparatus of claim 1, comprising:
sequence tracking circuitry configured to determine a number of contiguous instruction fetch entries for instructions that are contiguous in program order, wherein
the control circuitry is configured to suppress allocation of the further instruction fetch entry to the instruction fetch queue in response to the number of contiguous instruction fetch entries meeting or exceeding the limit value.

12. The apparatus of claim 11, wherein
in response to fetching an instruction indicated by a corresponding instruction fetch entry, the prefetching circuitry is configured to cause a deallocation of the corresponding instruction fetch entry; and
in response to the number of contiguous instruction fetch entries being less than the limit value after the deallocation, the control circuitry is configured to cause the further instruction fetch entry to be allocated to the instruction fetch queue.

13. The apparatus of claim 11, wherein
the sequence tracking circuitry is configured to determine the number of contiguous instruction fetch entries based on a number of instruction fetch entries allocated to the instruction fetch queue since detecting a break in a predicted program flow.

14. The apparatus of claim 13, wherein
the sequence tracking circuitry is configured to detect the break in the predicted program flow based on at least one of:
an instruction fetch entry corresponding to a predicted taken branch instruction; and
a pipeline flush.

15. A system comprising:
the apparatus of claim 1, implemented in at least one packaged chip;
at least one system component; and
a board,
wherein the at least one packaged chip and the at least one system component are assembled on the board.

16. A chip-containing product comprising the system of claim 15 assembled on a further board with at least one other product component.

17. A method comprising:
storing instruction fetch entries in an instruction fetch queue;
for each of the instruction fetch entries, fetching an instruction indicated by that instruction fetch entry and causing the instruction to be allocated to an instruction cache; and
suppressing allocation of a further instruction fetch entry in response to a number of instruction fetch entries meeting or exceeding a limit value, wherein the limit value is less than a storage capacity of the instruction fetch queue.

18. A non-transitory computer-readable medium to store computer-readable code for fabrication of an apparatus comprising:
an instruction fetch queue for storage of instruction fetch entries;
prefetching circuitry configured, for each of the instruction fetch entries, to fetch an instruction indicated by that instruction fetch entry and to cause the instruction to be allocated to an instruction cache; and
control circuitry configured to suppress allocation of a further instruction fetch entry to the instruction fetch queue in response to a number of the instruction fetch entries meeting or exceeding a limit value, wherein the limit value is less than a storage capacity of the instruction fetch queue.

* * * * *